United States Patent [19]

Matsumoto et al.

[11] Patent Number: 5,658,021

[45] Date of Patent: Aug. 19, 1997

[54] PIPE JOINT

[75] Inventors: Shigeyuki Matsumoto; Yasuo Yabe; Tsuneyoshi Shibata; Masao Kanazawa; Minoru Sunaga; Nobuhisa Fukuda; Kenji Fuse; Yasumi Maruhashi; Mitsuaki Motoda; Kenji Miyatani, all of Tokyo, Japan

[73] Assignee: Benkan Corporation, Tokyo, Japan

[21] Appl. No.: 519,706

[22] Filed: Aug. 28, 1995

[30] Foreign Application Priority Data

Sep. 30, 1994 [JP] Japan .................... 6-262072

[51] Int. Cl.$^6$ ............................. F16L 17/00
[52] U.S. Cl. ............................ 285/112; 285/367
[58] Field of Search ..................... 285/367, 112, 285/373, 364, 365, 366

[56] References Cited

U.S. PATENT DOCUMENTS

| | | | |
|---|---|---|---|
| 2,451,354 | 10/1948 | Ohls | 285/112 |
| 2,479,960 | 8/1949 | Osborn | 285/112 |
| 3,003,793 | 10/1961 | Pitt | 285/112 |
| 3,116,078 | 12/1963 | Scherer | 285/112 |
| 3,156,489 | 11/1964 | Deringer | 285/112 |
| 3,851,901 | 12/1974 | Sills | 285/112 |

FOREIGN PATENT DOCUMENTS 275506  10/1964  Netherlands .............. 285/112

*Primary Examiner*—Eric K. Nicholson
*Attorney, Agent, or Firm*—Eric P. Schellin

[57] ABSTRACT

A pipe joint for connecting water supply pipe together and which utilizes compression seals between the pipe and the joint, and is comprised of a holding housing having a band body that surround a seal ring and a holding ring. A locking bolt is threadably tightened onto the holding housing. The seal ring is embedded and sealed within outside surface of both ends of the separated pipes after the locking bolt is threadably tightened. The holding ring is positioned to engage and become fully engaged within the groove at each of outside of the separated pipes, and hold the separation pipes against being easily separated after the locking bolt is threadably tight-end onto the holding housing.

5 Claims, 12 Drawing Sheets

PIPE JOINT

BACKGROUND OF THE INVENTION

1) Field of the Invention

This invention relates generally to improved joints for connecting water supply pipe together and, in particular, to a pipe joint which is used to join together pipes of same sizes and materials, and which utilizes compression seals between the pipes and the joint.

2) Description of the Prior Art

Figure 11:
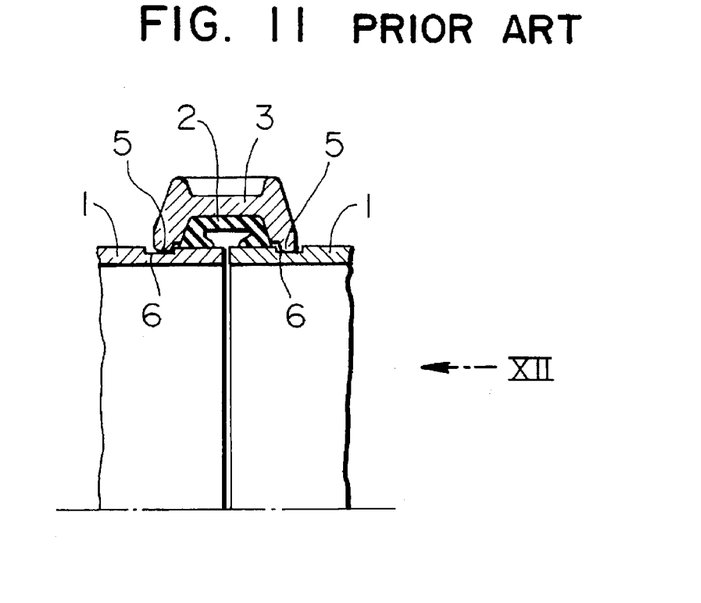
FIG. 11 is a partial cross-sectional view of a pipe joint according to prior art.
Figure 12:
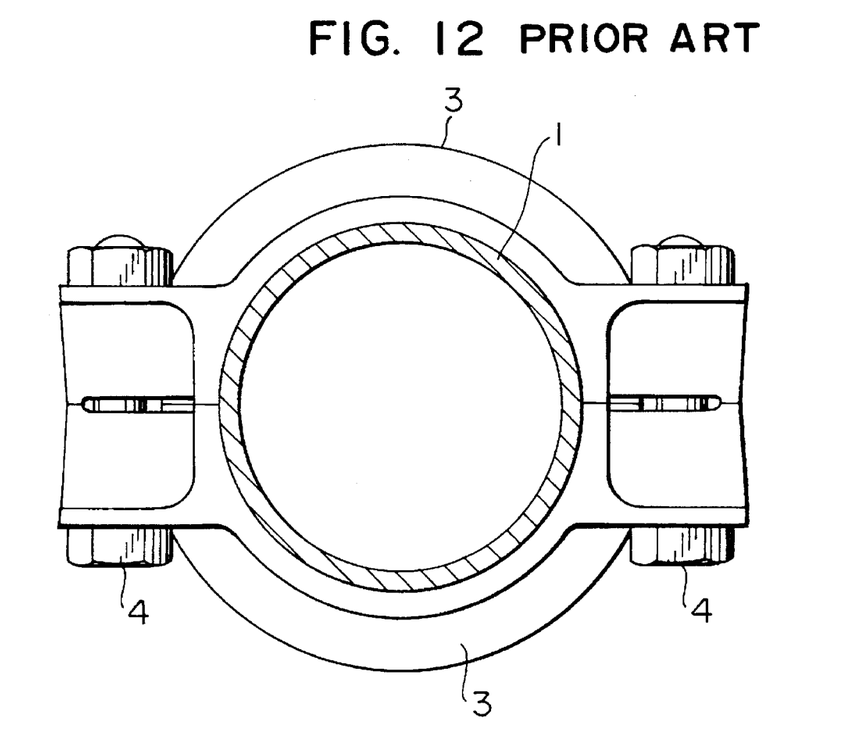
FIG. 12 is a side view taken along lines XII of FIG. 11 according to prior art.
Figure 13A:
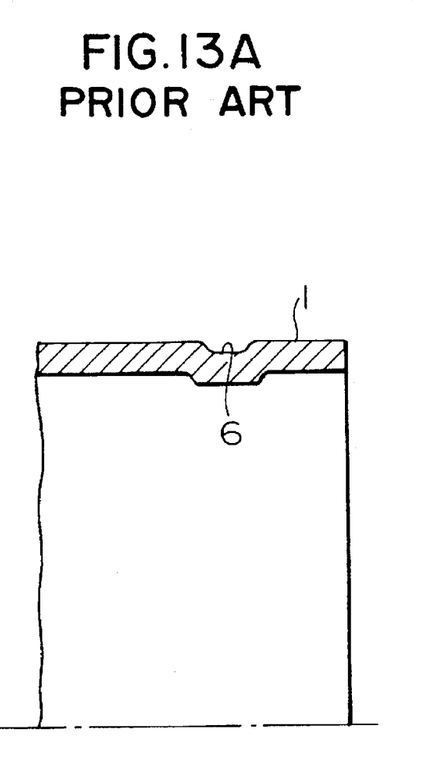
FIG. 13A is a partial cross-sectional view of a pipe joint showing a groove at each end surface of separated pipe to prior art.
Figure 13B:
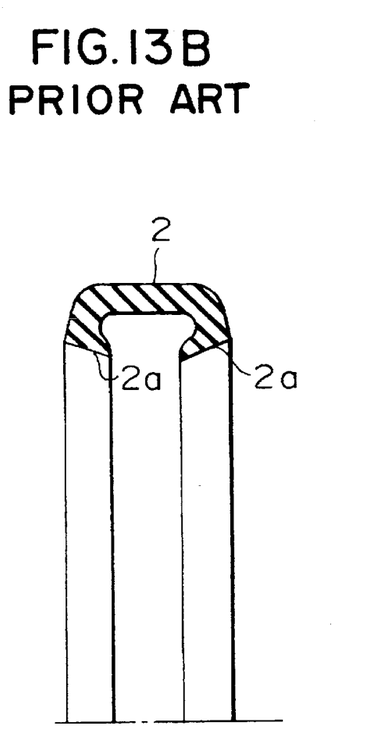
FIG. 13B is a partial cross-sectional view of a pipe joint showing a seal ring according to prior art.

As shown in FIGS. 11–13, in a prior art pipe joint, a seal ring 2 that is provided on inside of a joint half housing 3, 3 seals between the ends of separated pipe 1, 1, an inner rims 5, 5 of the joint half housing 3, 3 is being engaged into a groove 6, 6 formed at each end surfaces of separated pipe 1, 1.

The joint half housing 3, 3 is becoming on unity of housing to combine each others by the tightening of the bolts and nuts 4, 4.

As shown in FIG. 13B, the seal ring 2 is generally C-shaped in cross section and formed of a rubber, and has a flexible lip portion 2a at each end thereof, each of which is embedded and sealed within the outside surfaces of both ends of separated pipes 1, 1.

As shown in FIGS. 13A and 13B, the seal ring 2 has an inside diameter which is less dimension than an outside diameter of separated pipe 1, 1 to keep close tightly for a fluid leakage in the pipe joint.

Notwithstanding, disadvantage of prior art pipe joint is the inability easily inserting of the seal ring on the outside surface of both ends of separated pipes.

If during the fitting of the pipe joint to separated pipes, each joint half housing to be removed by removing of the bolts and nuts before the seal ring being to engage on both end of separated pipes; since a bolts and nuts is used for combination of the joint half housing, a lost bolts and nuts is caused by a poor working conditions at limited work spaces, this encounters unnecessary expense.

A correct placing and alignment of the inner rims of the joint half housing into the groove at both end surfaces of separated pipes is required for connecting the separated pipe together.

This is particulary a problem that the joint does not have itself the ability to recognize a correct alignment of the joint with separated pipes, that results in lowered reliability.

If during the fitting of the pipe joint to separated pipes, the seal ring may be embedded and sealed on outside surfaces of both ends of separated pipes, which fluid passing through the pipe joint is sealed without operator awareness, because an inside diameter of the seal ring is smaller dimension than the outside diameter of separated pipe 1, 1. However, this could cause the fluid leakage between the seal ring and the ends of separated pipe under normal water working pressure condition because of its lack of compression force of the seal ring within the joint housing.

Another form of prior art pipe joint is described in Japanese Patent Publication No. 55-25316 of 1980.

According to this apparatus, differing from that using the conventional pipe joint type, portion of the seal gasket having grip members in the joint housing, and which is particularly suited for use in connecting together pipes to more securely grip at each end smooth surfaces of separated pipe.

SUMMARY OF THE INVENTION

The present invention contemplates an improvement in the construction of the pipe joint which is particularly suited for use in connecting together metallic pipes to more securely seal and hold the pipes against being easily separated.

More specifically, the present invention aims to accomplish the foregoing by a novel adoption of a joint to use in connecting together separated pipes so that the joint may be used as a pipe joint to connect together pipe of same sizes and materials.

This is accomplished in the present invention to provide with unique parts particularly designed to securely seal and hold the separated pipes. Specifically, this is done without having to combine any of the joint half housing components of the prior pipe joint. The result is the pipe joint which provide easily correct embedding of the seal ring within the outer surface of the pipes and a saving in unnecessary expense and is secured in strength against being pulled apart only by the strength of its connection to the separated pipes.

Of additional advantage is that the unique construction of the pipe joint of the present invention enables it to be allowed to easily recognize the correct alignment between the pipe joint and the separated pipes. Thus, for example, the pipe joint may be used in preventing the fluid leakage without operator awareness.

The foregoing and other advantages of the present invention will become more apparent from the following description of the preferred embodiment when taken in conjunction with the accompanying drawings.

DETAILED DESCRIPTION OF PREFERRED EMBODIMENTS

Preferred embodiments of a joint for pipes will be described in full detail in conjunction with the accompanying drawings.

As shown in the drawings for purposes of illustration, the present invention is embodied in the pipe joint particularly adapted for use in connecting a separated pipes such as may be used in water supply system.

Figure 1:
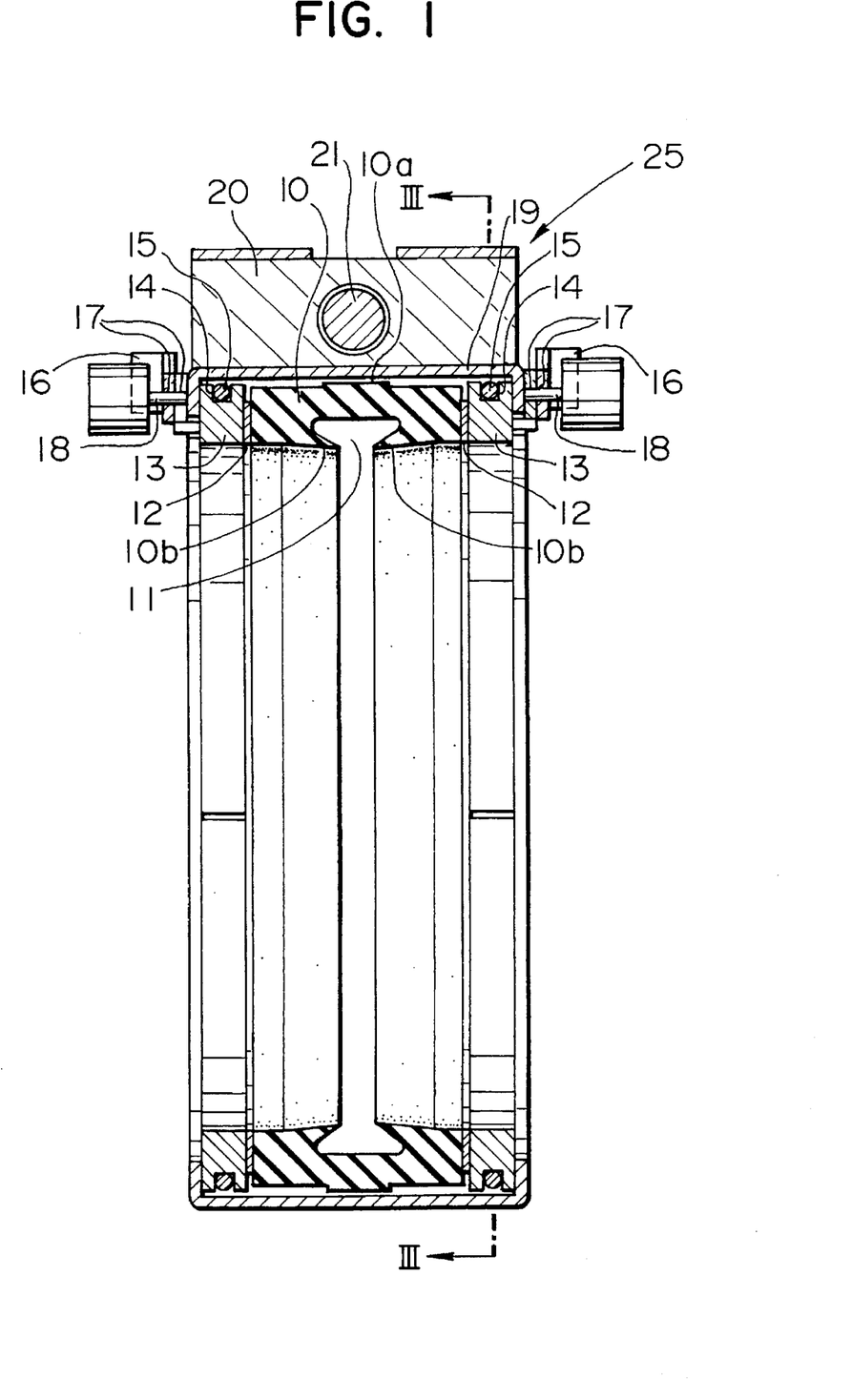
FIG. 1 is a cross-sectional view of a pipe joint taken lines I—I of FIG. 2, embodying the novel features of present invention and showing before being installed to connect pipes together.

The general arrangement of the pipe joint indicated generally at 25 in FIG. 1.

The pipe joint 25 comprises a circumferencial seal ring 10 having opposite end holding ring 13 which adapted for sealing and connection to the separated pipes 1, 1, respectively.

The seal ring 10 is generally C-shaped in cross section and provides a plurality of lip portion 10b and 10b at inner circumference thereof that together surrounds and seals the outside of the separated pipe 1, 1 and formed of a rubber having properties of gasket materials that is good resistance to water and other fluid.

To easily inserting and connecting the pipe joint to separted pipes the seal ring 10 has a diameter of its inner circumference that is a slight larger dimensions than an outside diameter of the separated pipes 1, 1.

The seal ring 10 has a convex portion 10a on its outer circumference which act as a compression transmission part for the diameter reducing of the seal ring 10.

To seal the separated pipes 1, 1 within the pipe joint 25, the seal ring 10 with the convex portion 10a is compressed inward to be embedded and sealed into the outer surface of the separated pipes 1, 1.

Each slide washer 12 is rests between the seal ring 10 and the holding ring 13. Outside diameter of the slide washer 12 is slightly small dimension than outside diameter of the seal ring 10 and the holding ring 13, and inside diameter thereof is same dimension of inside diameter of the seal ring 10 and the holding ring 13.

This slide washer 12 allows smooth radial relative sliding between the seal ring 10 and the holding ring 13.

Figure 3:
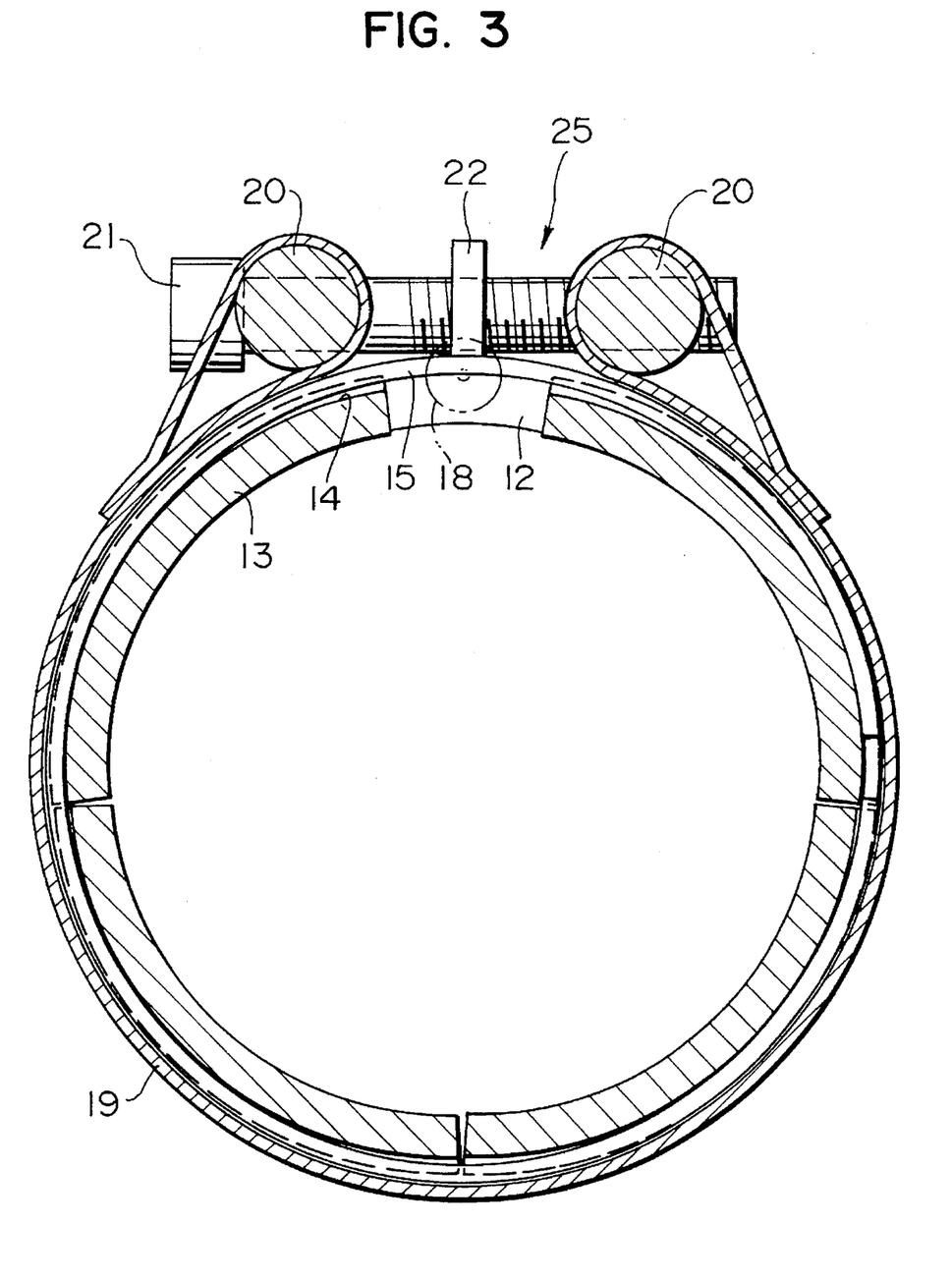
FIG. 3 is a cross-sectional view of parts of the pipe joint taken along lines III—III of FIG. 1.

Each holding ring 13 is pluralized into quarter segment on circumference with the gap defined between each segment thereof, and provided with U-shaped outer groove 14 on their outer circumferences.

The surface of the groove 14 is provided with a ring spring 15 in form of C-shaped to compress inwardly each quarter segment of the holding ring 13.

Herein, the quarter segment is together in unity with the holding ring 13.

Each of connecting lever 16 that is similar in structure to a strip is provided at side face of each two quarter segment, upper half quarter segment of the holding ring 13, includes a pair of oppositely arranged, and provide a pin hole 17 for engaging a hold pin 18 at adjacent to the center position thereof.

In present design, engaging the hold pin 18 into the pin hole 17 of the connecting lever 16, allowed the diameter enlargement of the holding ring 13 against compress force of the ring spring 15.

As a result, the enlargement of a space defined between the inside diameter of the holding ring 13, 13 and the outside diameter of the separated pipes 1, 1 can be allowed.

This construction is particularly concerned with the manner in which the pipe joint 25 is moved to permit smoothly inserting into the separated pipes 1, 1.

Figure 2:
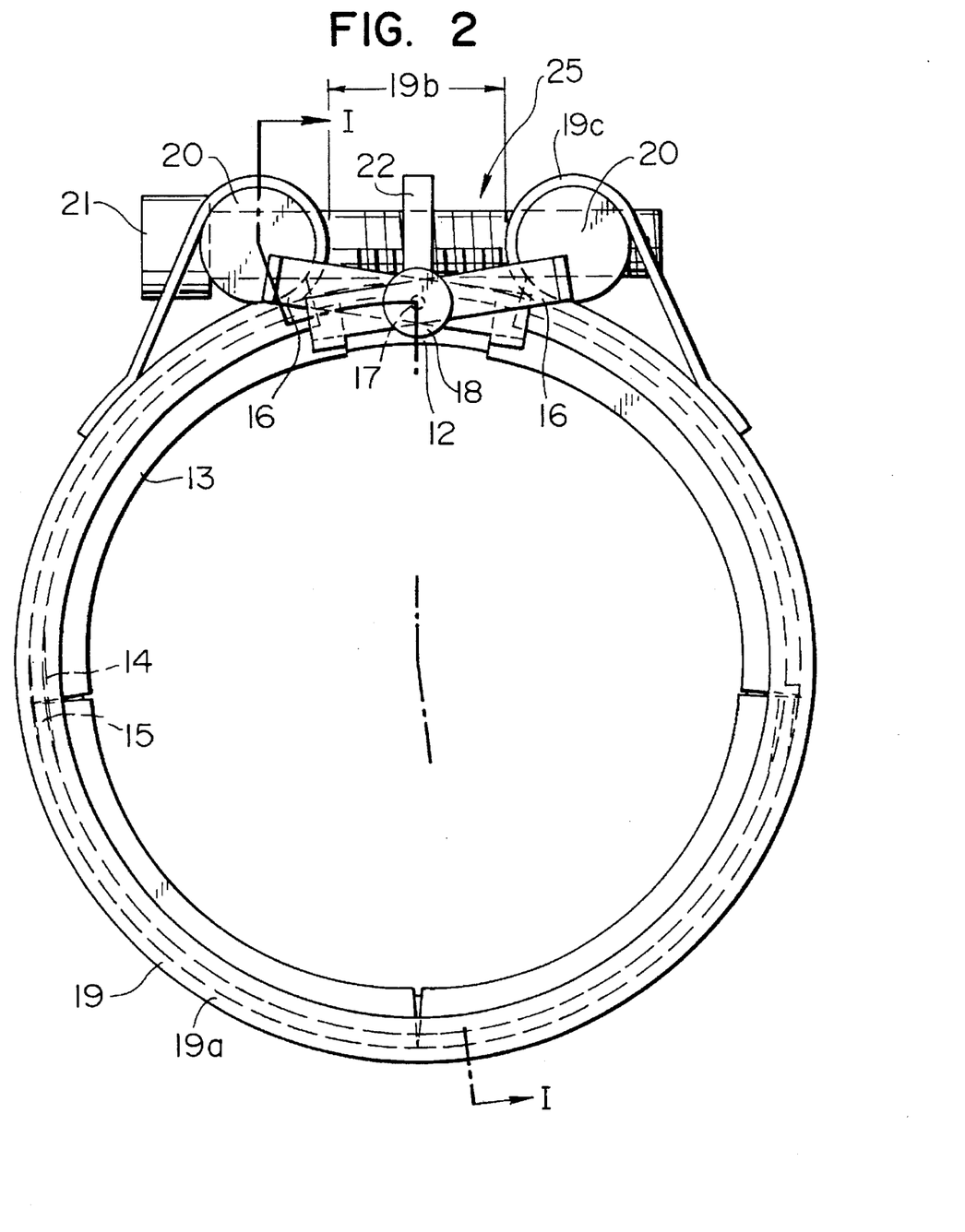
FIG. 2 is a right side view showing the pipe joint illustrated in FIG. 1.

A holding housing 19 having band body 19a is generally flat channel shaped in cross section, surrounds the seal ring 10 and the holding ring 13, 13, and having an opening portion 19b between both end of the band body 19a. The end portion of the band body 19a is formed with a fix loop 19c that is bent turn outwards in a curve along a web section thereof which fix a rod member 20 within the fix loop 19c, respectively integral.

Each of rod member 20, 20 having a threaded opening that is positioned at right angle to the axial direction thereof, and a locking bolt 21 having thread is threaded into the opposite thread openings of rod member 20, 20.

The locking bolt 21 provide with a spacer portion 22 at the center position thereof to allow a secure locking of the holding housing 19 by threading of the locking bolt 21 until the spacer portion 22.

More specifically, to lock the separated pipes within the pipe joint, the locking bolt 21 tightened within the thread openings of the rod members 20, 22.

Mating the tread into the thread openings are to enable the locking bolt 21 to be threadably tightened onto the holding housing 19.

Figure 4:
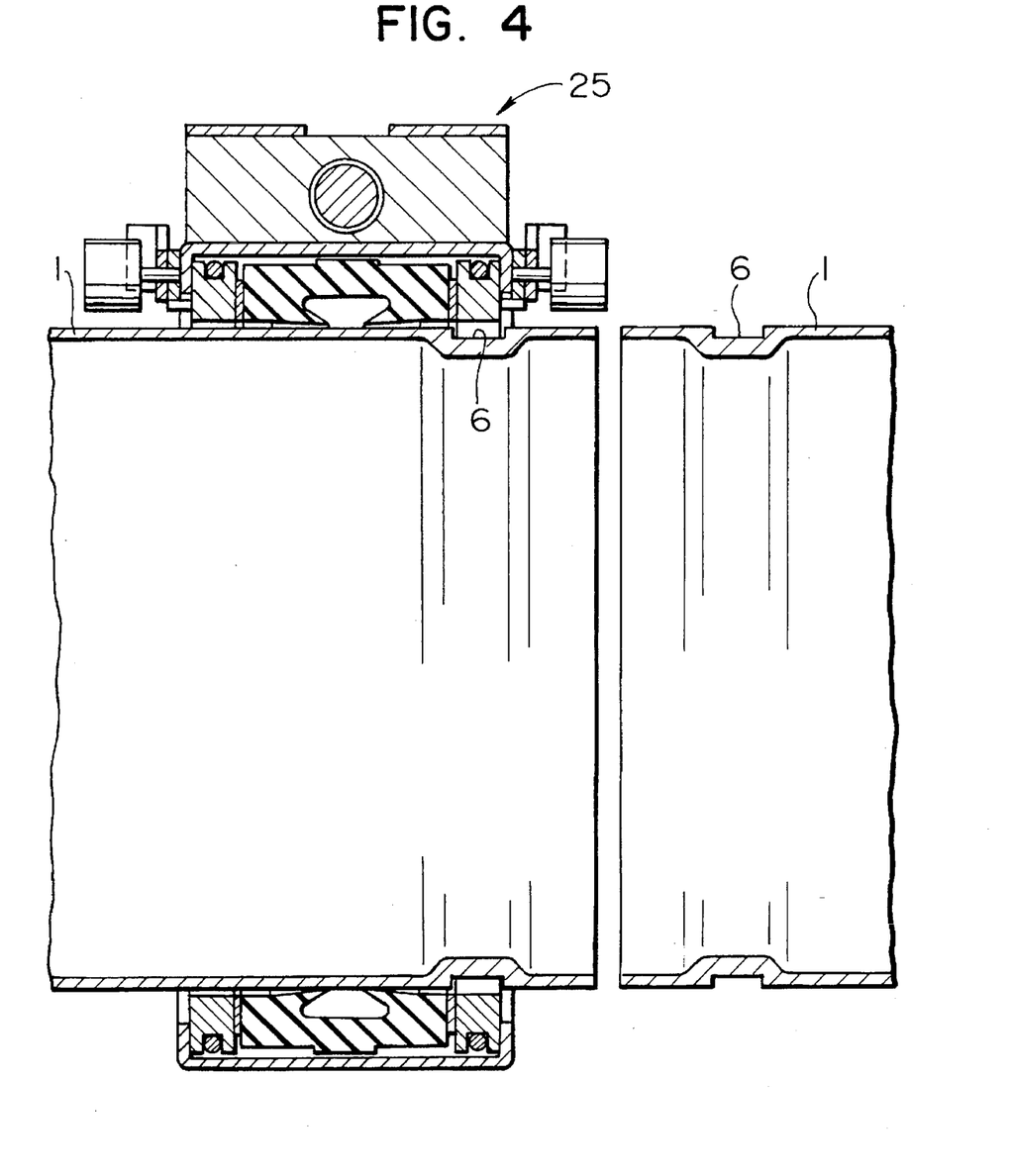
FIG. 4 is a cross-sectional view of the pipe joint illustrated in FIG. 1 showing the position of the pipe joint as one side of the separated pipe is initially inserted into the pipe joint.

As shown in FIG. 4, the pipe joint 25 illustrated in FIG. 1 is initially inserted into the outer surface of the one side of the separate pipes 1, 1, and one of the holding ring 13 of the pipe joint 25 is located facing to the groove 6 at end of the outer surface of the separated pipes 1, 1.

Under this initial position, as previously described, the pipe joint 25 is moved to permit smoothly inserted into the outer surface of one side of the separated pipes 1, 1.

Figure 5:
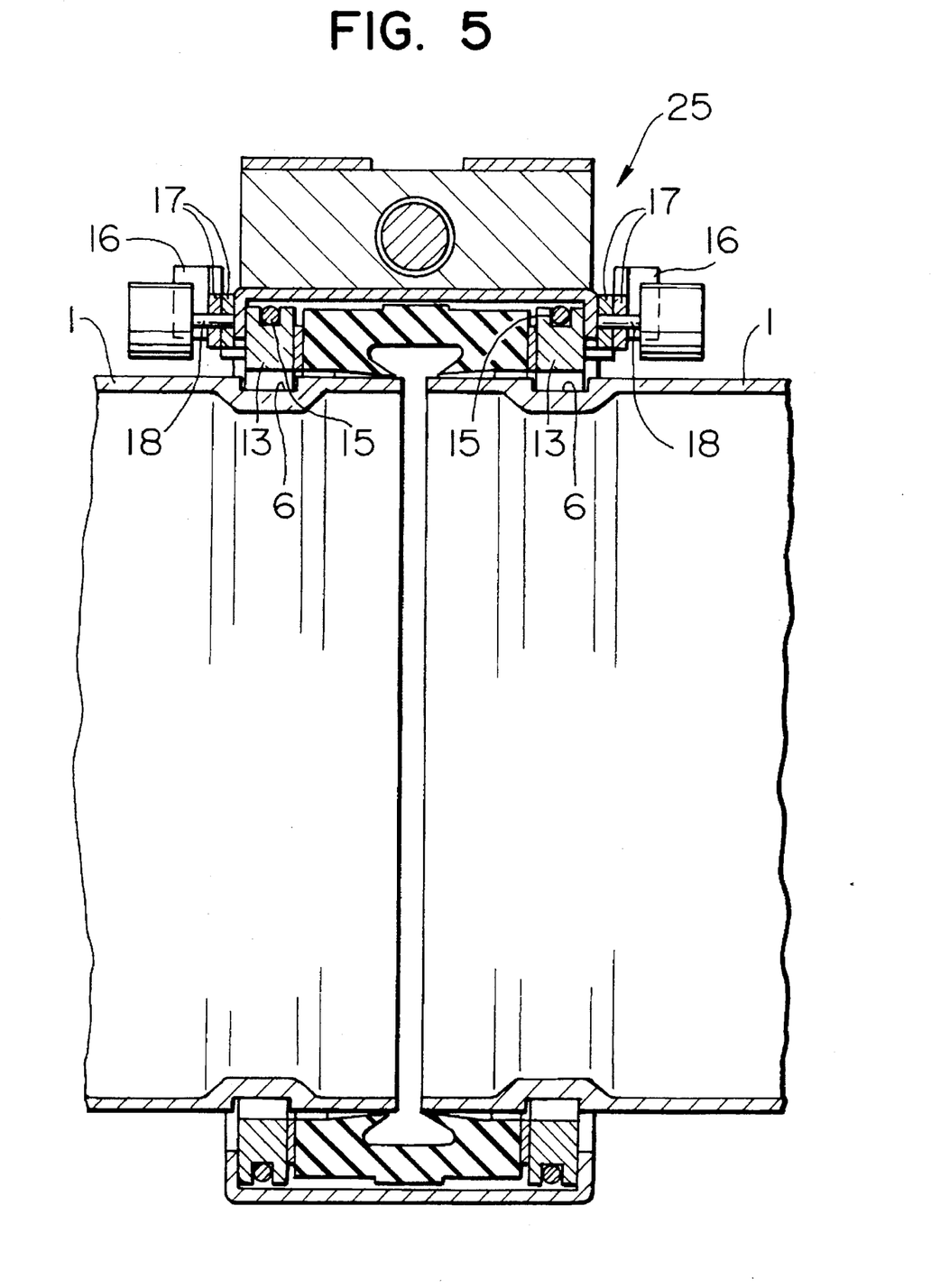
FIG. 5 is a cross-sectional view of the pipe joint illustrated in FIG. 1 showing the position of the pipe joint in moved positions to seal against the outside of the separated pipes and before being tightened down to seal against the outside of the separated pipes.

As shown in FIG. 5, the pipe joint 25 illustrated in FIG. 1 is in moved position that moved from the initial position thereof as illustrated in FIG. 4, to the outer surface of the other side of the separated pipe 1, and is inserted into the outer surfaces of the both side of the separated pipe 1, 1 and the position of each of the holding ring 13, 13 is located facing to the grooves 6, 6 at each of outer surface of the separated pipe 1, 1.

Under this moved position, as previously described, the pipe joint 25 is moved to permit smoothly inserted into each side of the separated pipe 1, 1.

Figure 6:
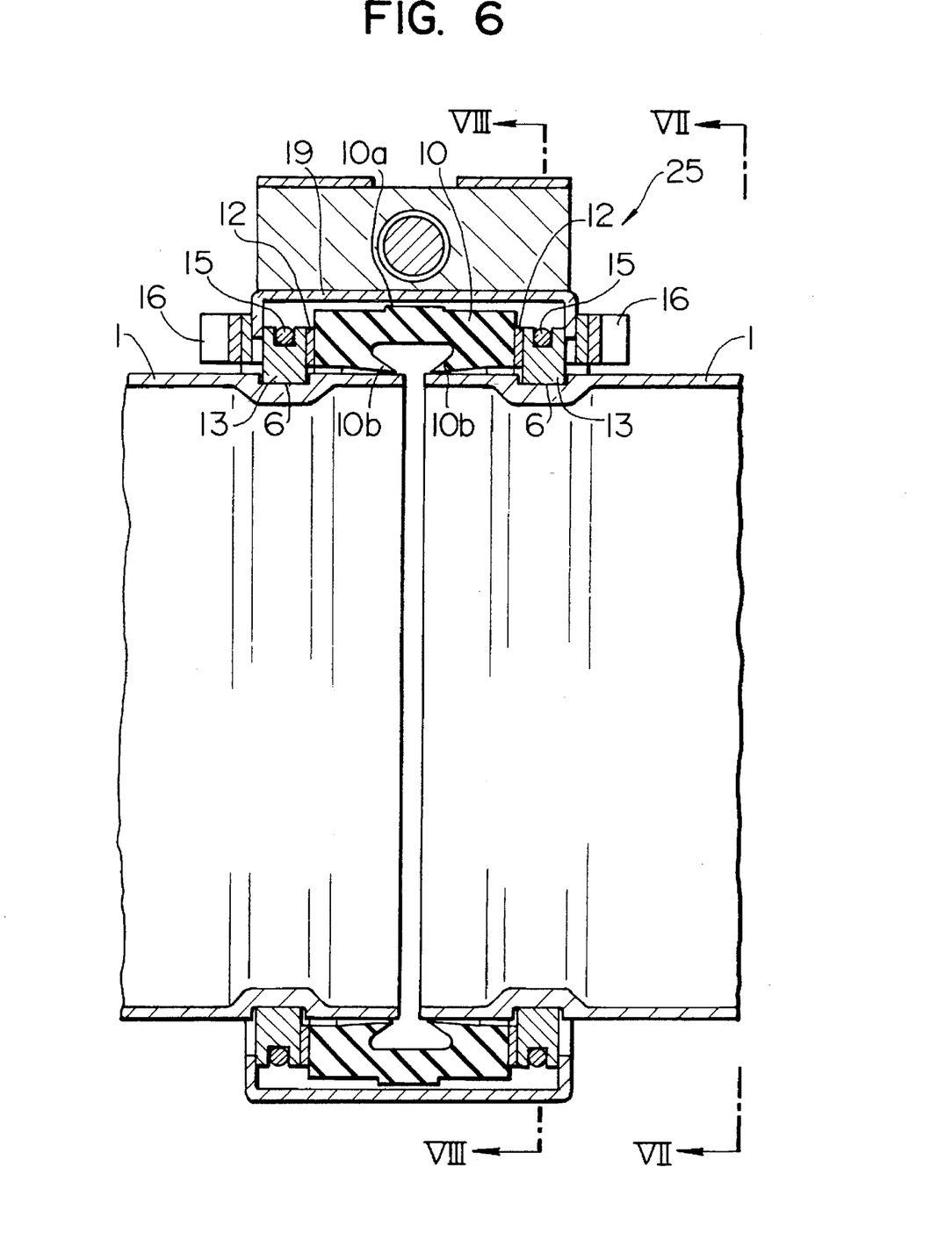
FIG. 6 is a cross-sectional view of the pipe joint illustrated in FIG. 1 showing the position of the pipe joint in engaged position to engage against the groove of the separated pipes, and before being tightened down to seal against the outside of the separated pipes.

As shown in FIG. 6, the pipe joint 25 illustrated in FIG. 1 is in engaged position that each of the holding ring 13, 13 of the pipe joint 25 is positioned to engage against the groove 6, 6 at each of outside of the separated pipes 1, 1.

Under this engaged position, the holding pin 18 is removed from the pin hole 17 of the connecting lever 16, 16 allowed the diameter reduction of the holding ring 13 due to compress force of the ring spring 15.

As a result, the reduction of the space defined as previously described, the inside surface of each of the holding ring 13, 13 becomes fully engaged against the groove 6, 6, however, before being tightened down to seal against the outside of the separated pipe 1, 1.

Figure 7:
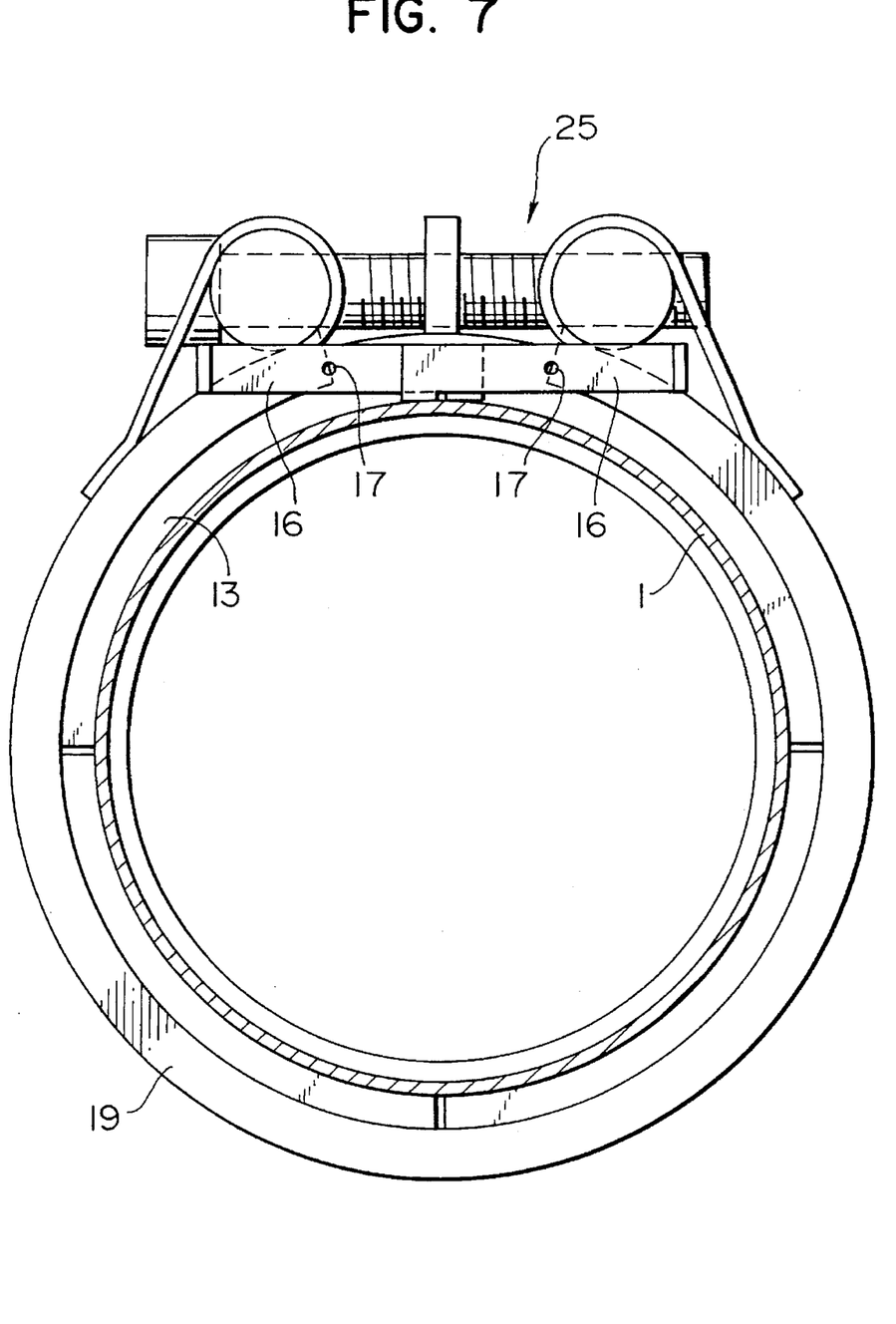
FIG. 7 is a cross-sectional view taken along lines VII—VII of FIG. 6.
Figure 8:
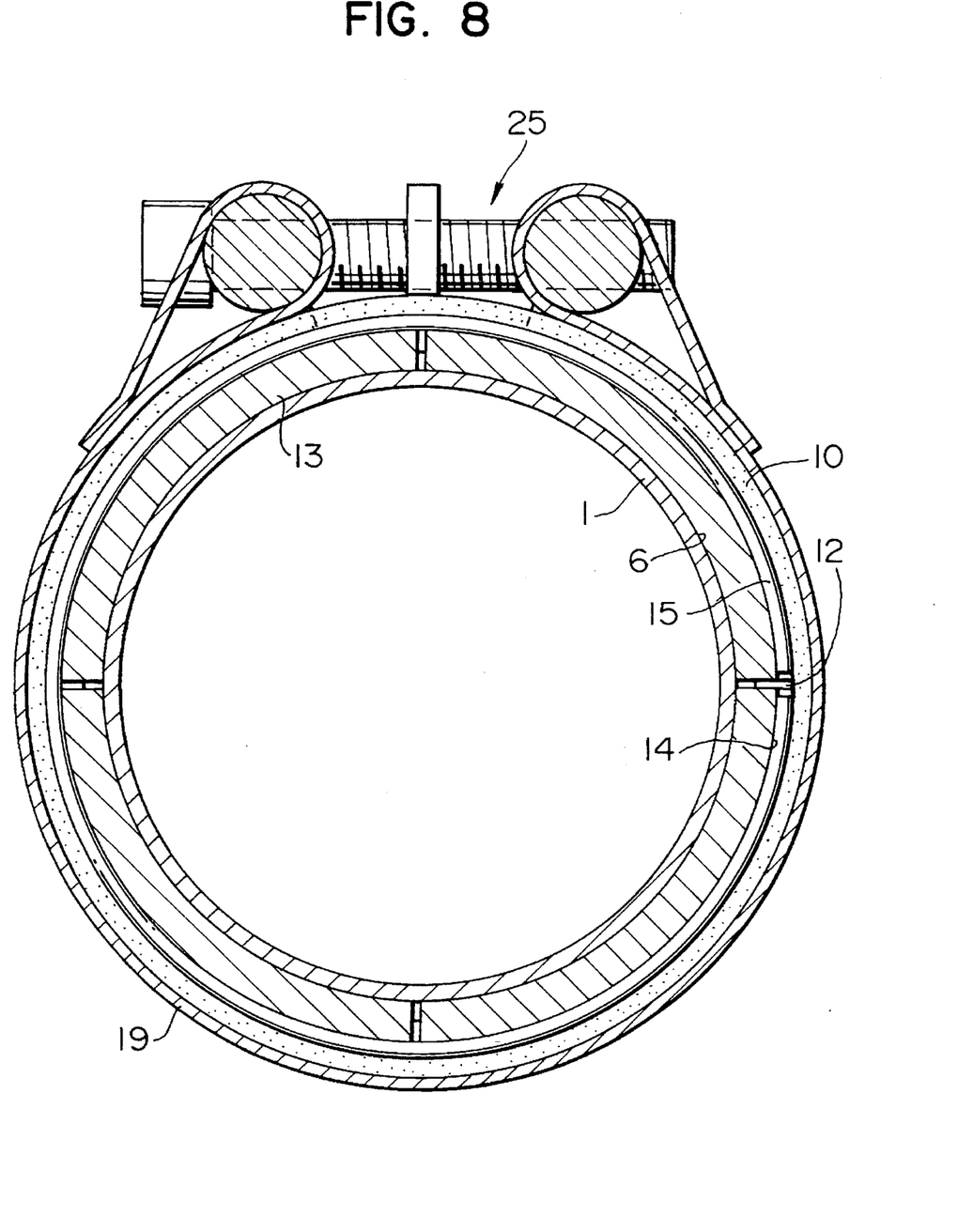
FIG. 8 is a cross-sectional view taken along lines VIII—VIII of FIG. 6.

Referring to FIGS. 7 and 8, the pipe joint 25 is in the engaged position that will be seen by referring to FIG. 6.

In the engaged position, after removal of the holding pin 18, the connecting levers 16, 16 associated with the holding rings 13 are in their withdrawn position.

These connecting levers 16, 16 have a line configuration so as to induce the compression force by the ring spring 15, and into the holding rings 13, 13 in effect the reduction of the space defined as previously described, thereby eventually making the holding rings 13, 13 to engage against the groove 6, 6 at each of outside of the separated pipes 1, 1.

These connecting levers 16, 16 have a coloured in a surface, so as to easily recognize the correct engagement of the holding rings 13, 13 against the groove 6, 6 at each outside of the separated pipes 1, 1.

Figure 9:
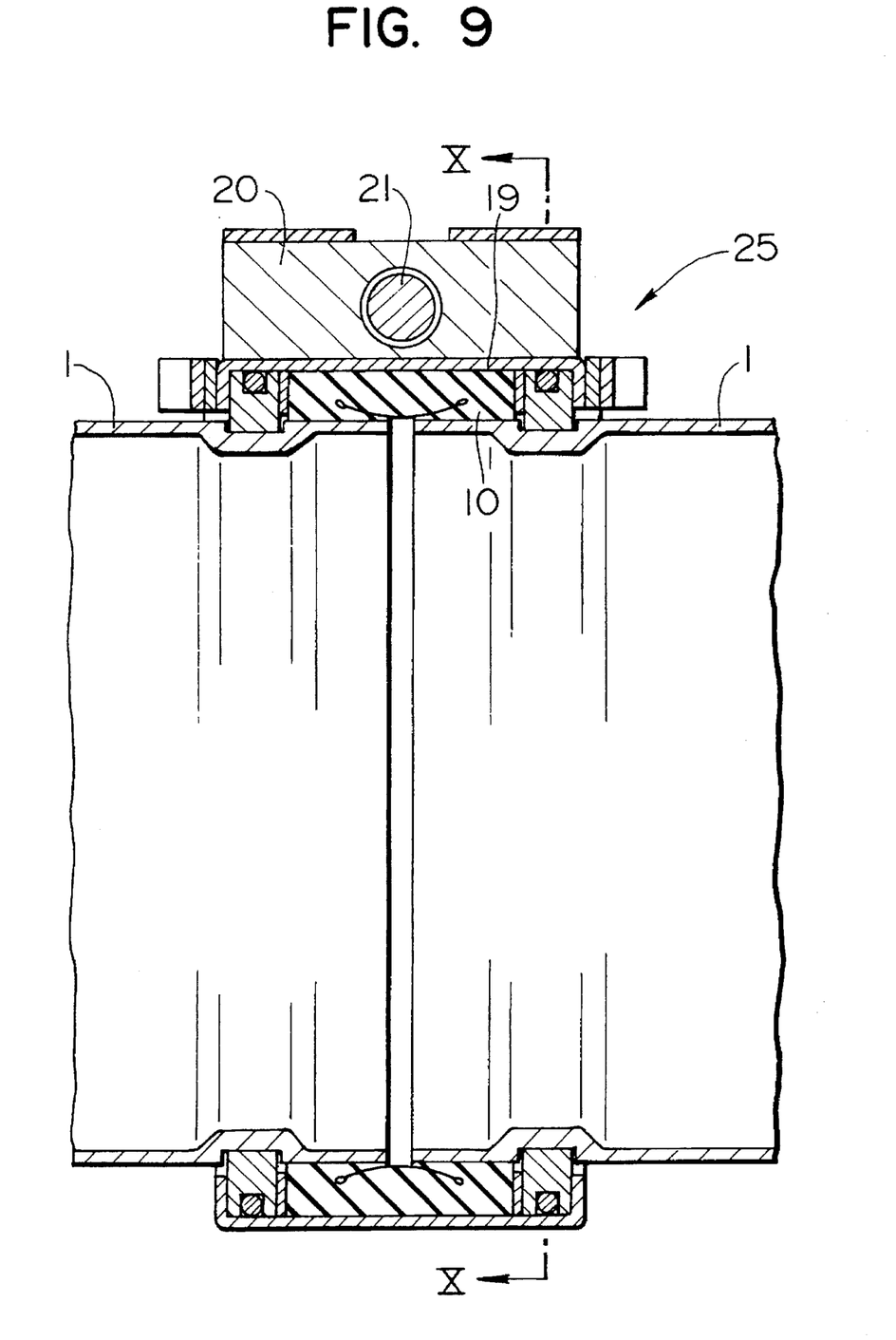
FIG. 9 is a cross-sectional view of the pipe joint illustrated in FIG. 1 showing the position of the pipe joint in sealed position to seal against the outside of the separated pipe and being tightened down to seal against the outside of the separated pipes.

As shown in FIG. 9, the pipe joint 25 is finally in sealed position being tightened down to that is the normal operating condition. Each of the holding ring 13, 13 engage into the groove 6, 6 and to seal against the outside of the separated pipes 1, 1, thereby, the separated pipe 1 and 1 are connected.

Figure 10:
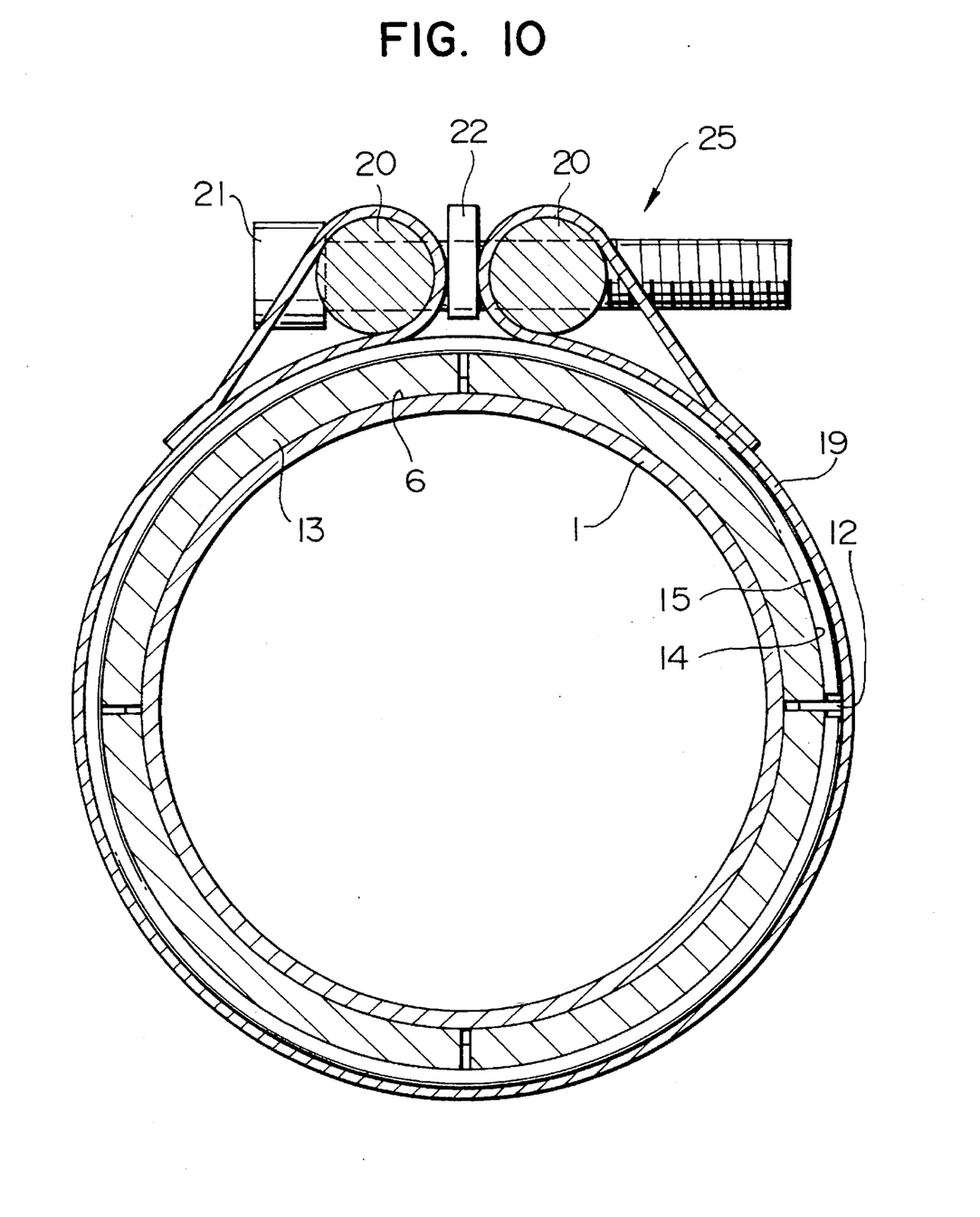
FIG. 10 is a cross-sectional view taken along lines X—X of FIG. 9.

In this sealed position, the band body 19a of the holding housing 19 is tightened by threading of the locking bolt 21 until the spacer portion 25 into the opposite opening of the rod member 20, 20. Then the holding ring 13, 13 is completely tightened down to engage into the groove 6, 6 of the outside of the separated pipes 1, 1.

For sealing against the outside of the separated pipe 1, 1 within the pipe joint 25, the convex portion 10a of the seal ring 10 is pushed radially inwardly to squeeze the seal ring 10 that together surround the opening between both end of the separated pipes 1, 1 and the lip portion 10b and 10b as an annular sealing surface formed on the inside surface of the seal ring 10 embedded within outside surface of both end of the separated pipes 1, 1, thereby, eventually making the pipes joint for connecting the separated pipes together, and used for a leakage proof fluid flow in the water or other fluid supply system.

As an added feature, however, the holding ring 13, 13 of the pipe joint 25 serves as a stop engageable into the groove 6, 6 at the outside of the separated pipes 1, 1, and hold the separated pipes 1, 1 within the pipe joint 25, and resist an axial force along the axial direction of the separated pipes 1, 1, and against to separate the pipes joint 25 and the separated pipes 1, 1.

In regard to assemble the pipe joint 25, an incorrect inserting or lack of the tightening of the holding housing 19 may be cause water leakage from the pipe joint 25.

Further, regardless of the tightening of the holding housing 19 into the separate pipe is provided, if nothing is placed in engagement of the holding ring 13, 13 against the groove 6, 6 may be cause similarly water leakage from the pipe joint 25.

In such a situation, the operator may be recognize the incorrect assembling of the pipe joint 25.

Thus, it is seen from the foregoing that present invention brings to the art a unique substantially pipe joint 25 which is particularly adapted for easily connecting the separated pipe 1 and 1 in a water supply system. Advantageously, this is achieved in the exemplary embodiment through the use of the holding ring which is comprised of the uniquely shaped divided segments thereof which enable use of the pin within the connecting lever for complete tightening to engage within the groove and against separation from the separated pipes.

Of additional advantage is that the present invention enables easily recognizing the correct alignment of the pipe joint, thereby eventually making the pipe joint itself superflows as fluid leakage without operator awareness would be prevented.

While the invention has been described with regards to the preferred embodiment, it is recognized that the present invention may be devised which would not depart from the scope of the present invention.

What is claimed is:

1. A slip on pipe joint comprising:

an annular flexible compressible ring adapted and constructed to bridge separated end portions aligned ends of two pipes of generally like diameter;

a segmented annular ring disposed axially at each side of said annular flexible compressible ring;

each of said segmented annular rings having a groove facing outwardly radially, said grooves of said segmented annular rings having an annular spring means whereby to draw said segments together to thereby decrease the diameter of said segmented annular ring;

a band having two end portions and being radially inwardly facing U-shaped in cross section, said band being wrapped about said compressible ring and said segmented annular rings;

each of said end portions of said band being payed about horizontally displaced members;

each of said members having threaded aligned holes therethrough, each of said member being connected by a threaded screw means adapted and constructed to draw said members together when rotated in one direction and to move said members apart when rotated in the other direction whereby to move said end portions of said band together or apart to thereby tighten said band about said compressible ring about the separated end portions of said pipes.

2. The pipe joint according to claim 1 wherein there is included an annular slide washer at each side of said compressible ring and interposed between said compressible ring and each of said segmented annular rings;

said slide washer having a bore diameter the same as the inner diameter of the compressible ring and a bore diameter the same as the inner diameter of the segmented annular ring, said slide washer having an outer diameter less than the outer diameter of the compressible ring and less than the outer diameter of the segmented annular ring.

3. The pipe joint according to claim 1 wherein said segmented annular rings include a plurality of arcuate segments, at least two of the adjacent segments are arcuately spaced from each other each of said spaced adjacent segments being fitted with an extending manually manipulative lever adapted and constructed to hold said segmented annular rings in a position whereby said pipe joint may slipped over the to-be-connected end portions of said separated pipes.

4. The pipe joint according to claim 3 wherein said levers are restrained from being manually manipulatively moved by stop means.

5. The pipe joint according to claim 3 wherein there is included an annular slide washer at each side of said compressible ring and interposed between said compressible ring and each of said segmented annular rings;

said slide washer having a bore diameter the same as the inner diameter of the compressible ring and a bore diameter the same as the inner diameter of the segmented annular ring, said slide washer having an outer diameter less than the outer diameter of the outer diameter of the compressible ring and less than the outer diameter of the segmented annular ring.

* * * * *